United States Patent [19]
Nakane et al.

[11] Patent Number: 5,699,973
[45] Date of Patent: Dec. 23, 1997

[54] TAPE REEL HAVING AIR DISCHARGING GROOVES FORMED IN FLANGE

[75] Inventors: Takanobu Nakane; Kiyoo Morita, both of Kanagawa, Japan

[73] Assignee: Fuji Photo Film Co., LTD., Kanagawa, Japan

[21] Appl. No.: 844,623

[22] Filed: Apr. 21, 1997

Related U.S. Application Data

[63] Continuation of Ser. No. 420,607, Apr. 12, 1995, abandoned.

[30] Foreign Application Priority Data

Apr. 20, 1994 [JP] Japan ............... U.M.HEI.6-005443 U

[51] Int. Cl.$^6$ .............. G11B 23/087; B65H 75/00
[52] U.S. Cl. .............................. 242/345; 242/614
[58] Field of Search ............... 242/345, 345.1, 242/614, 614.1, 348; 360/132

[56] References Cited

U.S. PATENT DOCUMENTS

| | | | |
|---|---|---|---|
| 877,398 | 1/1908 | Brinley | 242/614.1 X |
| 2,649,260 | 8/1953 | Beneke | 242/578.1 |
| 4,932,604 | 6/1990 | Maehara et al. | 242/345 |
| 5,456,423 | 10/1995 | Sakurai et al. | 242/614 |

FOREIGN PATENT DOCUMENTS

| | | |
|---|---|---|
| 136504 | 4/1985 | European Pat. Off. . |
| 588219 | 3/1994 | European Pat. Off. . |

OTHER PUBLICATIONS

Patent Abstracts of Japan, vol. 017 No. 550 (P-1624), Oct. 4, 1993 & JPA 05 151743 (Hitachi Maxell Ltd), Jun. 18, 1993.

*Primary Examiner*—John Q. Nguyen
*Attorney, Agent, or Firm*—Sughrue, Mion, Zinn, Macpeak & Seas, PLLC

[57] ABSTRACT

A tape reel having a cylindrical tape winding face on which magnetic tape is to be wound, and upper and lower flanges formed at upper and lower ends of said tape winding face. Grooves (20), which are designed to discharge to the outside the air interposed between portions of the magnetic tape that is wound on a tape winding face (8), are provided in the surface of the lower flange (9) which contacts the magnetic tape. The dimensions of each part are set so that the opening area of the grooves (20) lying within the tape winding range (21) where the magnetic tape is wound is 30 percent (standard value) or more relative to the total area of the tape winding range (21). By this structure, even in the case where the magnetic tape is wound at high speed on the tape winding face (8), the air interposed between portions of the magnetic tape is rapidly discharged to the outer periphery through the grooves (20), and the winding attitude is good.

14 Claims, 6 Drawing Sheets

TAPE REEL HAVING AIR DISCHARGING GROOVES FORMED IN FLANGE

This is a continuation of application Ser. No. 08/420,607 filed Apr. 12, 1995, abandoned.

BACKGROUND OF THE INVENTION

1. Field of the Invention

The present invention relates to tape reels for magnetic tape, or the like, and in particular relates to a tape reel which is of the open reel type or which is incorporated in a magnetic tape cassette for use in a VTR, or the like, and which is provided with flanges on upper and lower ends of a tape winding face.

2. Description of the Related Art

Conventionally, with regard to magnetic tape cassettes used, for example, in VTRs, there are various types of systems such as the β system, the VHS system, etc. They are, however, roughly similar in basic design such that a magnetic tape 100 is wound on a pair of tape reels 101, 102, and is stored inside a cassette 103, one example of which is known by U.S. Pat. No. 4,932,604 and is shown in FIG. 11.

The basic design of a tape reel used with magnetic tape is shown in FIGS. 8 and 9. With regard to the tape reel 40, a tape winding drum 2 on which a magnetic tape is wound is constituted by a plurality of concentric cylindrical parts which includes: a tubular inner cylinder 6 which engages with a rotational drive shaft of a VTR; an outer cylinder 3 which is positioned to the outer side of the inner cylinder 6 and which constitutes a tape winding outer surface 8; and a middle cylinder 4 which is arranged, according to necessity, between the outer cylinder 3 and the inner cylinder 6. Between the inner cylinder 6 and the outer cylinder 3, a plurality of reinforcing ribs 7, 15, etc. are suitably provided along the radial direction of the tape reel 40. Furthermore, above and below the tape winding drum 2, upper and lower flanges 10 and 9 are provided so as to conduct tape protection, such as, for example, prevention of winding turbulence or winding breakage of the magnetic tape.

In many cases, the lower flange 9 is integrally molded to the tape winding drum 2, while the upper flange 10 is separately molded and then attached and combined to the upper end of the tape winding drum 2 to form the tape reel. This is because, for the reasons explained below, the materials of the upper and lower flanges 10 and 9 are different from each other. That is, with regard to the lower flange 9, since a reel brake means engages at engaging teeth formed on its periphery, since the rotational drive shaft of the VTR engages at the inner cylinder 6, since a leaf spring, which is designed to energize the tape reel 40 downwardly, engages at a projection 51 provided on the top of the inner cylinder 6, and so on, a high mechanical strength is required. For this reason, the lower flange 9 is integrally molded with resin such as polyoxymethylene (POM), high-impact polystyrene (HIPS), or the like. In contrast, with regard to the upper flange 10, since it is not required to be as strong as the lower flange 9, and since it must have permeability to light so as to allow viewing by a user of the winding state of the magnetic tape from the outside, it is formed from a material, different from the lower flange 9, such as acrylonitrile styrene (AS), general-purpose polystyrene (GPPS), or the like, which is comparatively inexpensive.

At the time of manufacture of the magnetic tape cassette, the quality of the winding attitude of the magnetic tape constitutes a problem. Conventionally, in order to improve the winding attitude, winding has been conducted while the upper edge of the magnetic tape is pressed down, for example, by tape-like unwoven cloth toward the lower flange 9 side, or as described in U.S. Pat. No. 4,857,388, the winding has been conducted while the magnetic tape is urged down by means of a magnet arranged at the bottom of the lower flange 9 so that the magnet attracts magnetic material spread on the magnetic tape.

In addition, the magnetic tape is wound under the condition that the lower edge of the magnetic tape is lowered onto the inner surface of the lower flange 9 in advance by means of a tape guide with a collar arranged at the entry side of the magnetic tape. According to this method, the winding is conducted while the upper edge of the magnetic tape is made even by bringing the lower edge of the magnetic tape into contact with the inner surface of the lower flange 9. By this means, it is intended to realize a good winding attitude.

According to the aforementioned magnetic tape winding methods, however, although it is possible to have a good winding attitude in the case where the winding speed of the magnetic tape is comparatively low, it is difficult to prevent turbulence in the winding attitude in the case where the winding speed is high, for example, when the winding speed reaches a level of 10 m/s or higher which is as high as in the fast-forward mode or rewind mode. This is because, if the winding speed of the magnetic tape becomes high, when the oncoming magnetic tape portion is wound upon the already wound magnetic tape portion, air interposed between the magnetic tape portion is abruptly compressed and a lubrication action occurs, with the result that the magnetic tape portion which is subsequently wound tends to be displaced by any vibrations, or the like, toward the upper flange 10 side where there is some clearance or space.

In particular, as shown in FIG. 10, a normal magnetic tape 30 is provided with magnetic material 31 on one face of a base film 32, and exhibits the property of cupping which causes concave curving on the base film 32 side. As a result, when the magnetic tape 30 is wound, it often tends to swell with air. Consequently, in the state where the cupping phenomenon is present, the winding attitude tends to become poor due to the lubrication action by the accompanying air.

In the conventional tape reel, in order to prevent this winding turbulence of the magnetic tape 30 from occurring at the time of high-speed winding, concave grooves, which are designed to discharge the air interposed between portions of the magnetic tape 30 toward the outer peripheries of the upper and lower flanges 10 and 9, are provided in the inner surface of either one of or both of the upper and lower flanges 10 and 9.

However, it has not been accurately understood whether or not the conventional grooves unfailingly discharge the air interposed between portions of the magnetic tape 30, and presently such grooves are simply formed without performing any research whatsoever concerning their size and shape, and so on.

In fact, the grooves of the conventional tape reel are constituted by disposing three to six grooves each having a narrow width, and a groove opening ratio of all grooves, as described below is just 10% or so at the largest. For the reason, the conventional tape reel is disadvantageous in that the winding attitude has been poor when the magnetic tape is wound on such a tape reel.

SUMMARY OF THE INVENTION

The present invention was made in light of the above problem. An object of the present invention is to provide a standard value for the opening area of the air discharge grooves which are provided in the inner surface of either one of or both of the upper and lower flanges, and to provide a tape reel which is able to unfailingly realize a good winding attitude even in the case of high-speed winding of the magnetic tape.

The above object of the present invention can be achieved by a tape reel having a cylindrical tape winding face on which magnetic tape is to be wound, and upper and lower flanges formed at upper and lower ends of the tape winding face, wherein: grooves are provided in an inner surface of at least one of the upper and lower flanges which are contacted by the magnetic tape so that air interposed in between parts of the magnetic tape wound on the tape winding face is discharged through the grooves to outer peripheries of the upper and lower flanges; and an opening area of the grooves lying within a range where the magnetic tape is wound on the inner surface is from 30 to 98 percent of an area of the range where the magnetic tape is wound.

The above object also can be achieved by such a configuration wherein the width of the grooves in the circumferential direction is widened from the inner peripheries of the upper and lower flanges toward the outer peripheries of the same.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENTS

Figure 1:
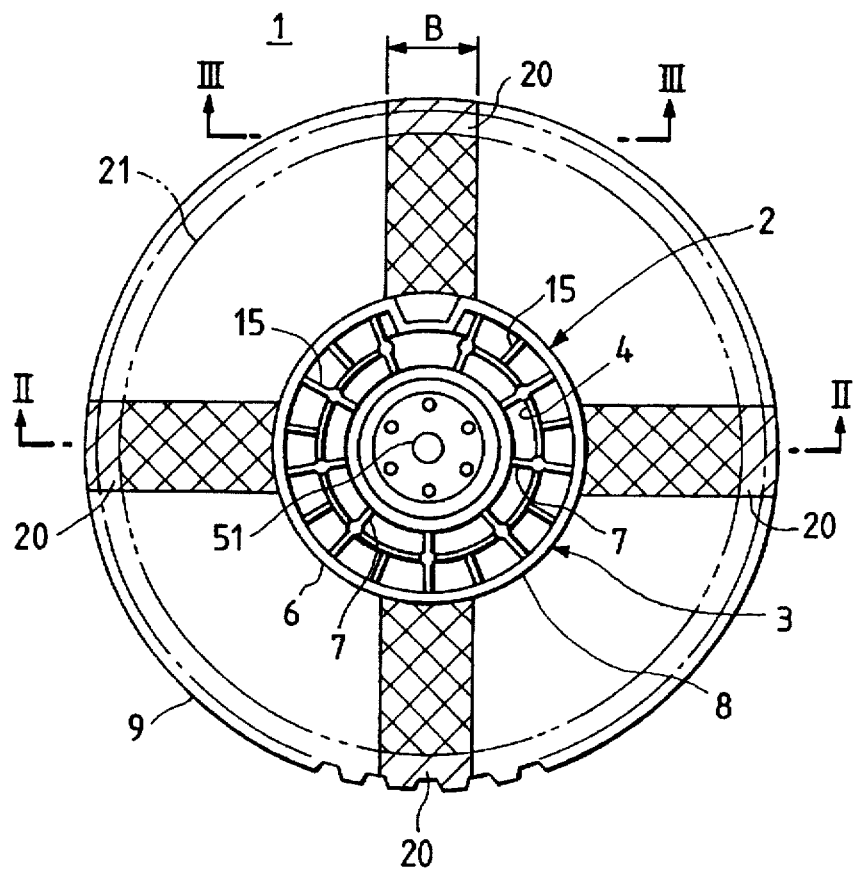
FIG. 1 is a plan view of a tape reel which is an embodiment of the present invention.
Figure 2:
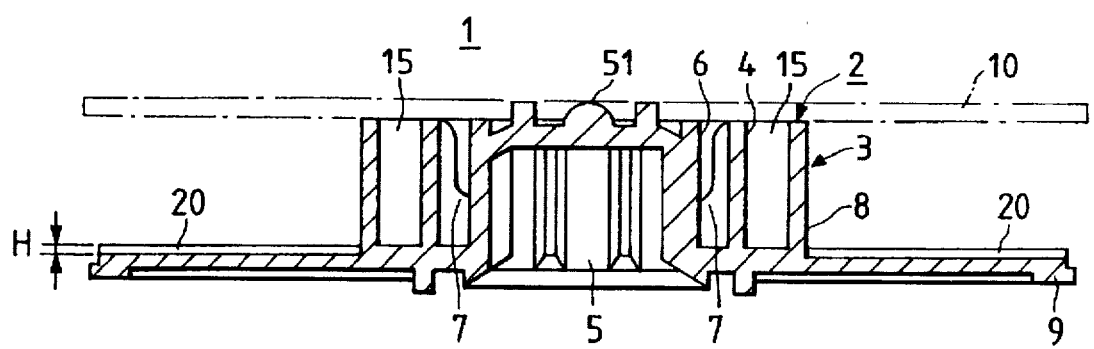
FIG. 2 is a vertical cross-sectional view which is cut along the line II—II of FIG. 1.

Below, an embodiment of the present invention is explained with reference to the drawings. With regard to parts which are identical to the conventional tape reel, the same reference numbers are applied, and a detailed explanation thereof is omitted. FIG. 1 is a plan view of a tape reel 1 for a magnetic tape, according to the present embodiment. FIG. 2 is a vertical cross-sectional view along the line II—II of FIG. 1.

With regard to the tape reel 1 of the present embodiment, a tape winding drum 2 (core) is provided with a plurality of concentric cylindrical parts including: an inner cylinder 6 which is provided with an engagement hole 5 that engages with, for example, a rotational drive shaft of a VTR, etc.; a middle cylinder 4 which is provided at the outside of the inner cylinder 6 and which is concentrically spaced a suitable clearance from it; and an outer cylinder 3 which is provided further to the outside in a concentric manner relative to the middle cylinder 4 and which constitutes a tape winding face 8. In addition, the middle cylinder 4 and the outer cylinder 3 are connected to each other through a plurality of reinforcing ribs 15 which are provided along the radial direction of the tape reel 1, and the inner cylinder 6 and the middle cylinder 4 are connected to each other through the reinforcing ribs 7. A lower flange 9 is molded integrally with the lower end of the tape winding drum 2. On the other hand, a transparent upper flange 10 is separately molded and fastened to the upper end of the tape winding drum 2. A magnetic tape is wound so that it contacts the inner surface of the lower flange 9, and so that a slight clearance is made between the upper flange 10 and the magnetic tape.

The above configuration is identical to the conventional one, but the characteristic configuration of the tape reel 1 of the present embodiment is such that, as shown by the hatched parts of FIG. 1, grooves 20 designed to discharge the air interposed between portions of the magnetic tape to the outer periphery of the tape reel 1 are formed to a specified size in the inner surface of the lower flange 9 which contacts the magnetic tape. Here, four grooves 20 are provided at equal intervals along the circumferential direction of the flange 9 from the innermost periphery to the outermost periphery of the lower flange 9, but it is acceptable to have at least one or more of the grooves 20.

Figure 3A:
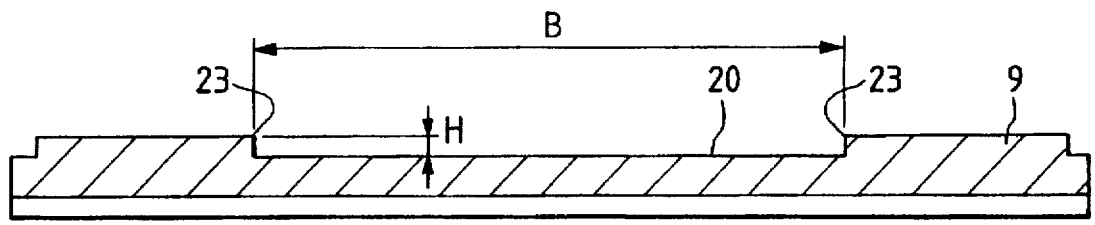
FIGS. 3(A) and 3(B) are vertical cross-sectional views which are cut along the line III—III of FIG. 1 and which show variations of the shape of the upper end edges of the grooves.
Figure 3B:
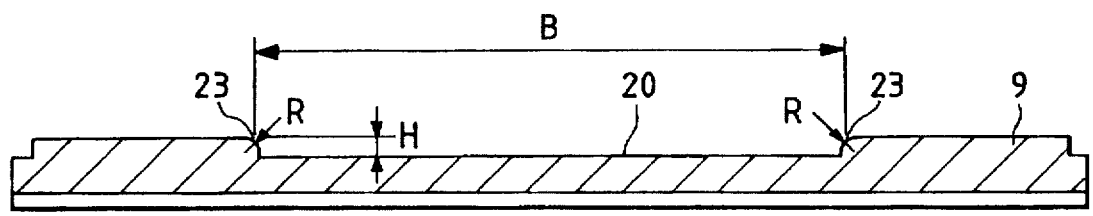

The width B of each of the grooves 20 is identical from the inner periphery to the outer periphery of the flange 9. Upper end edges 23 of the grooves 20 may be made perpendicular to eliminate burrs as shown in FIG. 3(A), or may be rounded as at R as shown in FIG. 3(B). In this way, it is possible to prevent the situation where the magnetic tape is caught and damaged by the upper end edges 23 of the grooves 20.

The total area of the tape winding range (hereinafter referred merely as Tt) is a ring-like area in which, when viewed in the vertical direction on a plane of the lower flange, a maximum tape winding range 21 (double-dotted line) of the magnetic tape serves as an outer periphery whereas the tape winding surface 8 of the outer cylinder 3 serves as an inner periphery. On the other hand, the total opening area (hereinafter refereed merely as Tg) is an area of a part of the grooves 20 which overlaps the total area of the tape winding range, i.e., a part of the grooves 20 which is cross-hatched in FIG. 1.

Figure 4:
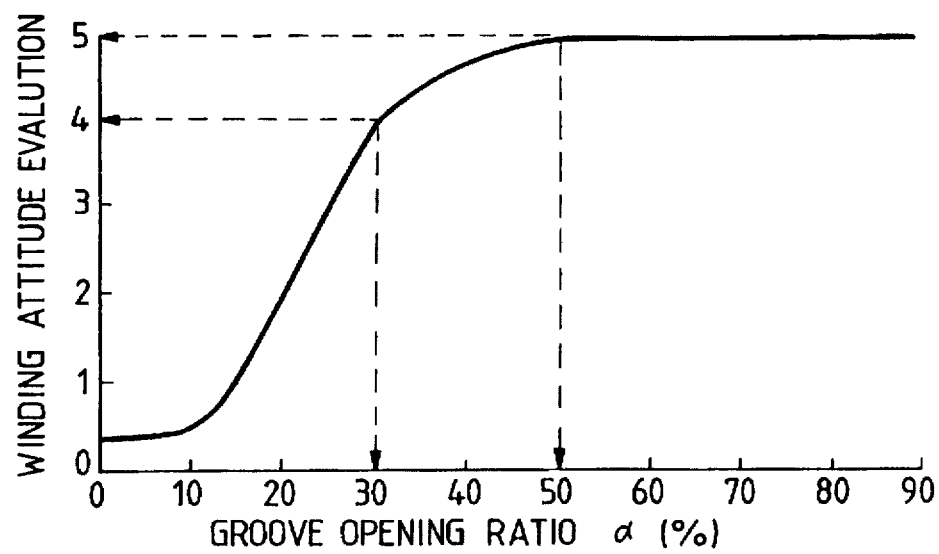
FIG. 4 is a graph which shows the relationship between the groove opening ratio α and the winding attitude evaluation.

As a result of observing winding attitudes when the magnetic tapes were wound while making various changes in the ratio of the total opening area of all the grooves (Tg) lying within the tape winding range 21 to the total area of the tape winding range (Tt), that is, the groove opening ratio α (=Tg/Tt ×100), their relations were found to be as shown in FIG. 4. In FIG. 4, the horizontal axis is the groove opening ratio α (%), and the vertical axis is the winding attitude evaluation (grades). With regard to the winding attitude evaluation, winding turbulence where the tape edge partially projects out was classified into 5 stages; evaluation grade "4" indicates a situation where no winding turbulence can be noted with the naked eye, and in practical terms is a very preferable state.

When the winding attitude evaluation was observed in the case of the standard value of grade "4", it was found that the opening ratio α of the grooves 20 was 30 percent. Moreover, it was found that an opening ratio α constituting an evaluation of "5" where winding turbulence does not occur at all was 50 percent or higher. Even if the opening ratio is much larger than 50%, the winding attitude maintains the evaluation 5 indicated above.

As described above, the opening ratio is effective if it is within a range of 30% to 98%, and preferably within a range of 40% to 80% and more preferably within a range of 50% to 70%.

FIG. 4 shows the case where the tape width was 12.65 mm, the coefficient μ of friction of the surface (magnetic surface) on which the magnetic material of the magnetic tape was provided was 0.15 to 0.35, the winding speed S of the magnetic tape was 2.8 to 4.8 m/second, and the depth H of the grooves 20 was 0.05 to 0.25 mm. Furthermore, the lower edge of the tape immediately before winding and the lower flange 9 were set so as to be positioned on the same plane.

Figure 5:
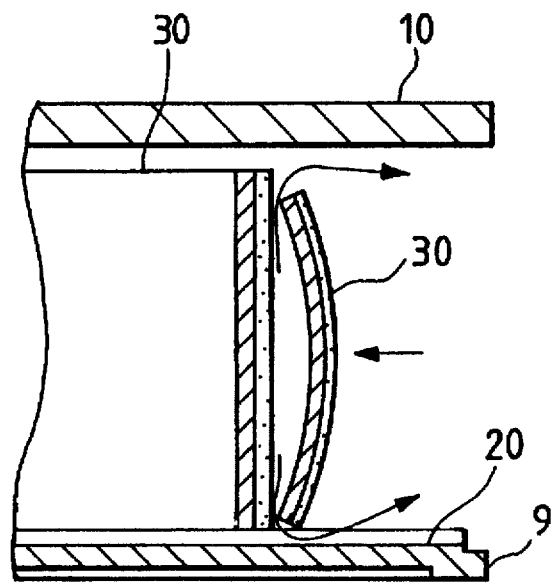
FIG. 5 is a drawing which shows the state before discharge of the air between portions of the magnetic tape of the embodiment.

With regard to the tape reel 1 where the air discharge grooves 20 are provided on the inner surface of the lower flange 9, assume, for purposes of illustration, the case where the magnetic tape is wound at high speed at the time of manufacture of, for example, a magnetic tape cassette. As shown in FIG. 5, when the oncoming portion of the magnetic tape 30 is wound onto the already wound portion of the magnetic tape 30, the air interposed between portions of the magnetic tape is compressed due to the tension applied to the oncoming magnetic tape 30 which is being wound and due to the pressure of the magnetic tape 30 which is further wound on the top of this, and the air is discharged to the outside from the gap between the upper flange 10 and the upper edge of the magnetic tape 30, and is discharged to the outer periphery of the lower flange 9 through the grooves 20.

Figure 6:
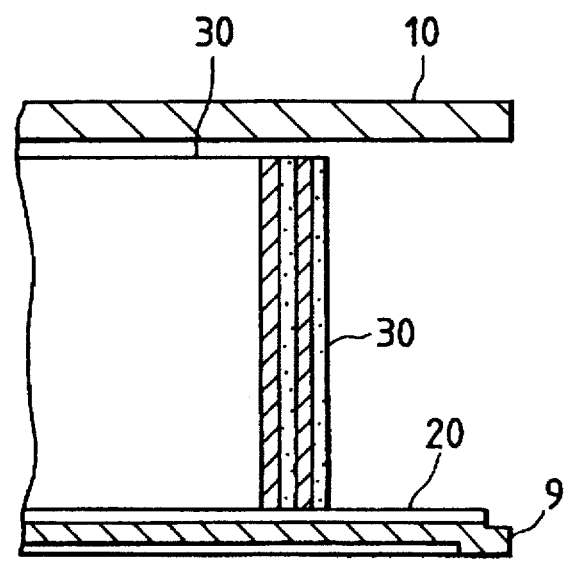
FIG. 6 is a drawing which shows the state after discharge of the air between portions of the magnetic tape of the embodiment.
Figure 8:
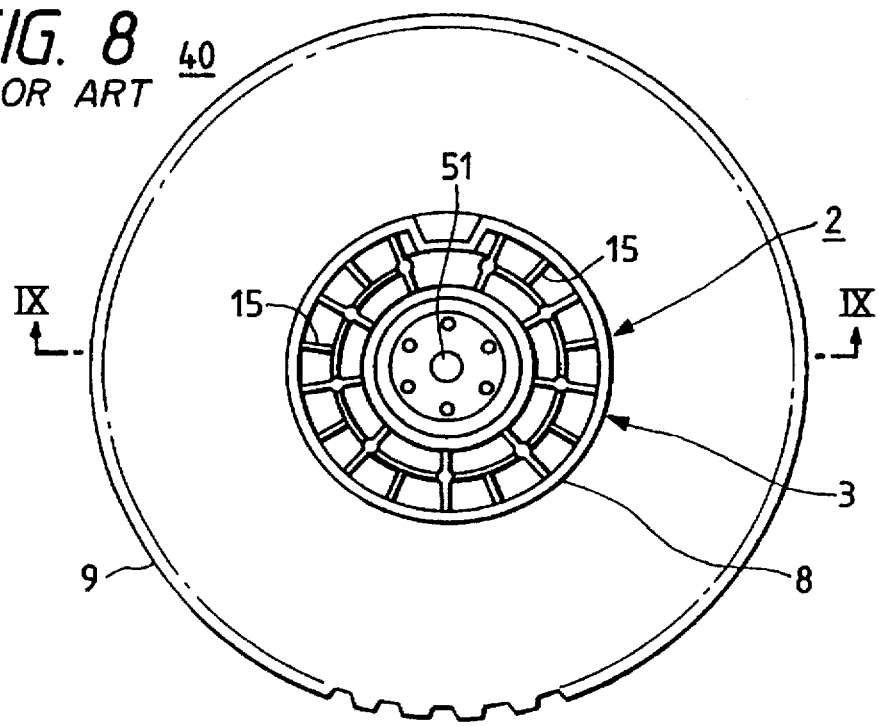
FIG. 8 is a plan view of a conventional tape reel.
Figure 9:
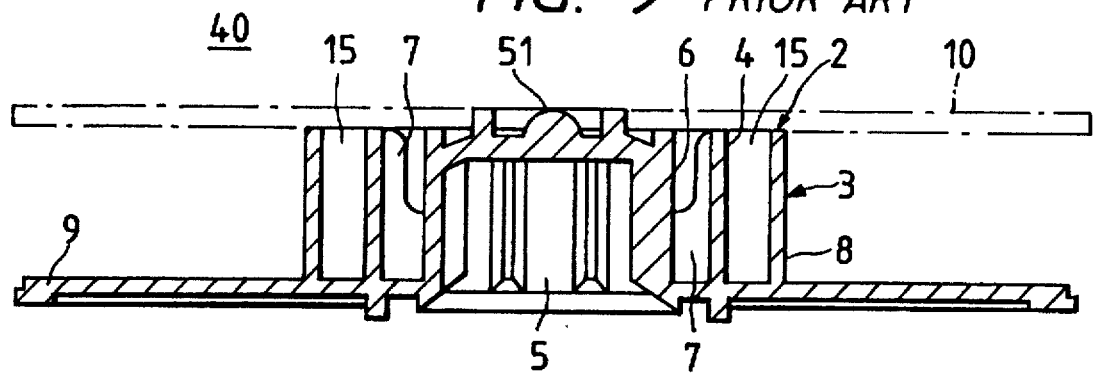
FIG. 9 is a vertical cross-sectional view which is cut along the line IX—IX of FIG. 8.
Figure 10:
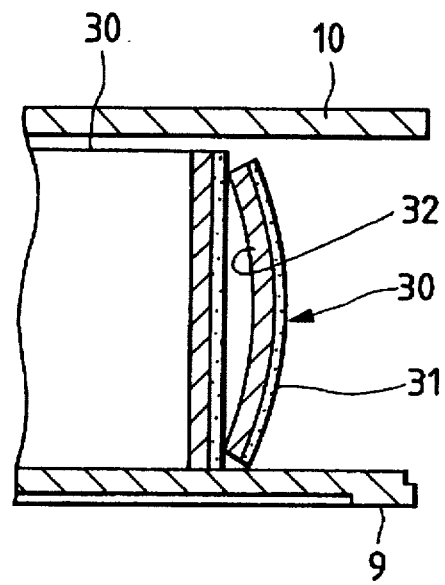
FIG. 10 is a schematic cross-sectional view to show the action of cupping of the magnetic tape.

Thus, since the air in the magnetic tape 30 is discharged faster in comparison with the conventional tape reel 40 which is not provided with the grooves 20 (FIG. 8), winding hardness is stable, and since the lubrication action of the air is reduced and the oncoming magnetic tape 30 being wound is urged to the lower flange 9 side by gravity, it is possible to prevent the upward displacement of the oncoming portion of the magnetic tape 30 being wound. As a result, as shown in FIG. 6, the upper edges of the already wound portion of the magnetic tape 30 and the oncoming portion of the magnetic tape 30 being wound are kept even, and it becomes possible to have an excellent winding attitude. This is not limited to the time of manufacture of magnetic tape cassettes, and even in the case where a magnetic tape cassette is loaded into a VTR and the fast-forward or rewind operation is conducted, there is the effect that the winding attitude of the magnetic tape improves. Furthermore, when the winding attitude of the magnetic tape 30 improves, since up-and-down movement of the magnetic tape 30 is eliminated when using the magnetic tape cassette, the running of the magnetic tape 30 improves, and it becomes possible to prevent the occurrence of jamming, and so on.

With regard to the above-mentioned tape reel 1, since it is possible to have a good winding attitude without the use of the conventional unwoven cloth or magnet, or the like, even in the case where the magnetic tape 30 is wound at high speed, it becomes possible to simplify the configuration of the manufacturing equipment and reduce costs. Similarly, if a magnetic tape cassette using the above-mentioned tape reel 1 is used in a VTR, etc., even in the case where high-speed winding is conducted in the fast-forward mode or rewind mode, it is possible to have a good winding attitude of the magnetic tape 30 without providing any special parts in the magnetic tape cassette.

Furthermore, with the present invention, since the standard value of the opening area of the groove 20 is clear-cut or distinct, it is possible to economize labor at the time of design and manufacture of the tape reel 1 compared to conventional tape reels, with the result that cost reduction becomes possible. At the time of manufacture, winding can be conducted while urging the magnetic tape 30 to the lower flange 9 side by a simple method.

As the material of the lower flange 9, it is possible to use resins such as polyoxymethylene (POM), high-impact polystyrene (HIPS), or the like, and as the material of the upper flange 10, on the other hand, it is possible to use resins such as acrylonitrile styrene (AS), general-purpose polystyrene (GPPS), or the like.

Figure 7:
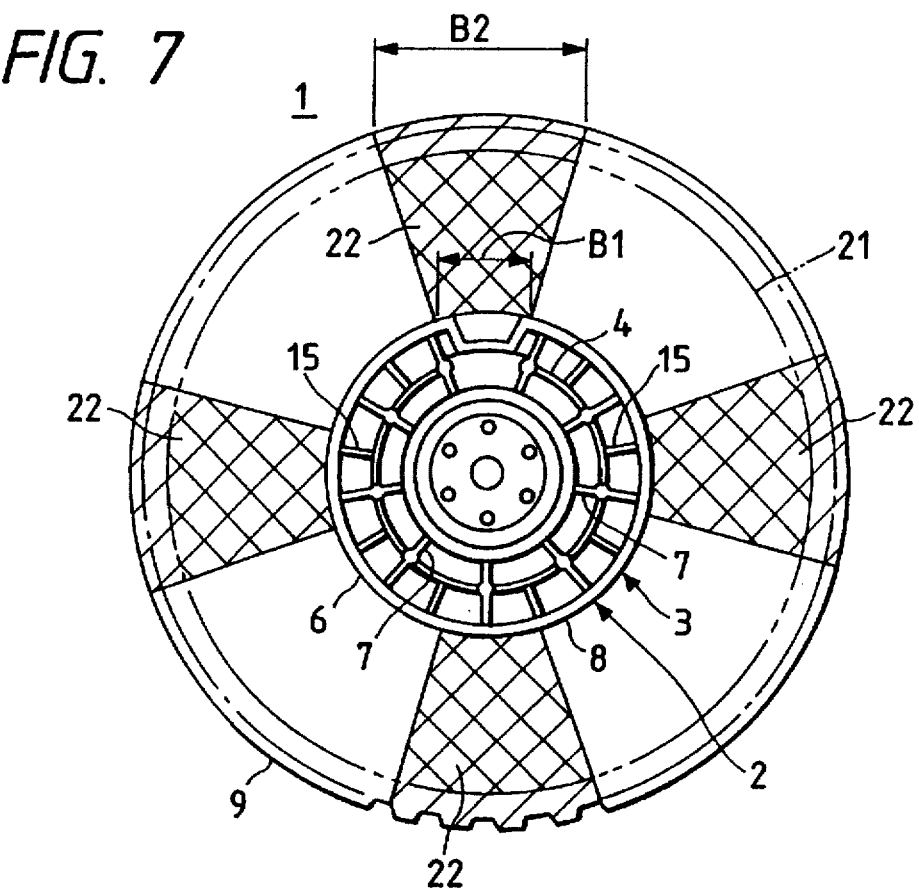
FIG. 7 is a plan view of another embodiment of the present invention.

A description has been made above regarding the foregoing embodiment for the case where the width B of the grooves 20 is identical from the inner periphery to the outer periphery of the reel, but, as shown in FIG. 7, which is a preferred embodiment of the invention, it is also possible to have the width of the grooves 22 in the circumferential direction of the reel gradually widen along the radial direction from the inner periphery (B1) to the outer periphery (B2) of the reel. Now, in the case where the magnetic tape 30 is wound while keeping the rotational speed of the tape reel 1 constant, since the circumferential speed at the outer periphery of the tape reel 1 becomes faster than at the inner periphery, the winding speed S becomes faster as the winding of the magnetic tape 30 progresses. At this time, since the discharge speed of the air in the magnetic tape 30 becomes faster at the outer periphery than at the inner periphery if the groove 22 becomes wider toward the outer periphery as in the present embodiment, it also becomes possible to have a good winding attitude of the magnetic tape 30 at the outer periphery where the winding speed S becomes high.

A description has been made about each of the foregoing embodiments for the case where the grooves 20 and 22 are provided in the lower flange 9, but in the case where the upper edge of the magnetic tape 30 contacts the inner surface of the upper flange 10, it is also possible to provide the grooves 20 and 22 on the inner surface of the upper flange 10. Furthermore, it is also acceptable to provide the grooves 20 and 22 in both the upper and lower flanges 10 and 9.

It is not necessary to define the number of the grooves formed on each flange be four as shown in FIGS. 1 and 7. The number of the grooves may be preferably selected from a range of three to ten. However, the number of the grooves may be over ten.

Figure 11:
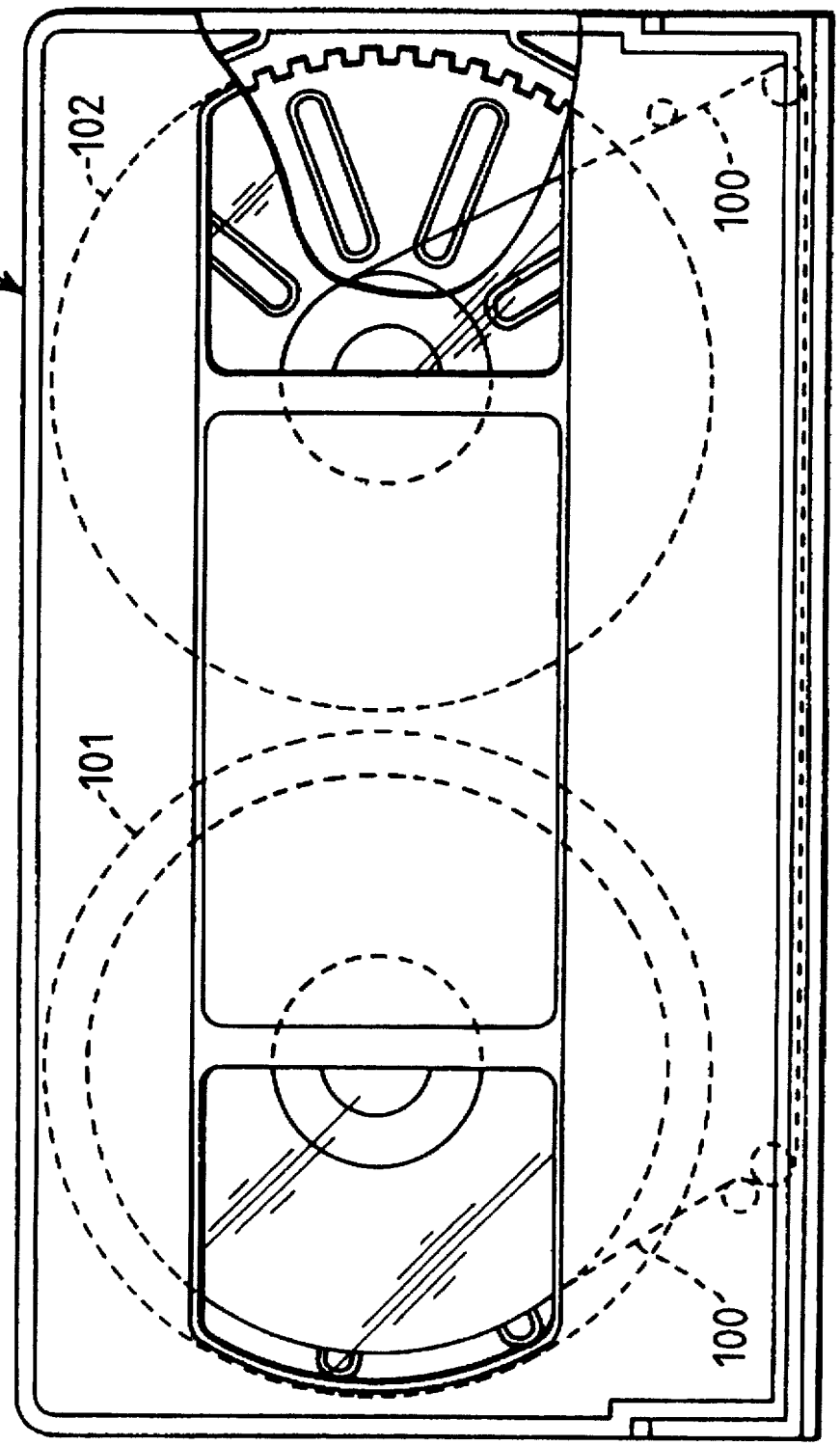
FIG. 11 is a plan view showing the basic tape cassette 103 for storing the magnetic tape.

A description has been made about the foregoing embodiments for the case where the present invention is applied to the tape reel 1 used in a magnetic tape cassette (see tape cassette 103 in FIG. 11), but the present invention is not limited thereto, and can, of course, be applied to various types of tape reels such as open reels, or the like.

As explained above, with regard to a tape reel provided with a cylindrical tape winding face on which a magnetic tape is wound and with upper and lower flanges on the upper and lower ends of the tape winding face, the present invention provides grooves, which are designed to discharge to the outer periphery of the upper and lower flanges the air interposed between portions of the magnetic tape which is wound on the tape winding face, in the inner surface of at least one of the upper and lower flanges which are contacted by the magnetic tape. Consequently, even in the case where the winding speed of the magnetic tape is high, for example, in the case of manufacture of magnetic tape cassettes with the present type of tape reels, or in the case of the use of the magnetic tape cassette with the present type of tape reels in the fast-forward mode or rewind mode, it is possible to have a good winding attitude of the magnetic tape without using special parts such as unwoven cloth or a magnet, or the like, and it is possible to simplify the configuration of the manufacturing equipment and the tape reels, and reduce costs.

Since the present invention has been made so that the opening area of the grooves lying within the range where the magnetic tape is wound on the inner surface is 30 percent or more of the area of the range where the magnetic tape is wound, the standard value of the opening area of the grooves is clear so that the dimensions of the shape of the grooves can be easily determined. Consequently, it is possible to economize labor at the time of design and manufacture of the tape reels, and cost reduction also becomes possible.

Furthermore, the present invention can be made so that the grooves widen from the inner periphery to the outer periphery of the upper and lower flanges. By this means, since the speed with which the air between portions of the magnetic tape is discharged to the outside through the grooves becomes faster at the outer periphery than at the inner periphery, in the case where the winding speed of the magnetic tape becomes fast at the outer periphery of the tape reel as when the magnetic tape is wound while the rotational frequency of the tape reel is constant, it is possible to have a good overall winding attitude from the inner periphery to the outer periphery.

It is contemplated that numerous modifications may be made to the tape reel of the present invention without departing from the spirit and scope of the invention as defined in the following claims.

What is claimed is:

1. A tape reel having a cylindrical tape winding face on which magnetic tape is to be wound, and upper and lower flanges formed at respective upper and lower axial ends of said tape winding face, each of said upper and lower flanges having an inner periphery proximate to said tape winding face and an outer periphery positioned radially apart from said tape winding face, said tape reel further comprising:

at least one groove disposed in an inner surface of said lower flange, the at least one groove extending radially from said inner periphery to said outer periphery, the at least one groove having a fan-shape with imaginary lines which extend from an innermost portion of sides of the at least one groove so as to intersect at the center of said lower flange, the inner surface being contacted by the magnetic tape so that air interposed in between parts of the magnetic tape wound on said tape winding face is discharged through said at least one groove to the outer periphery of said lower flange; and an opening area of said at least one groove on said inner surface being within a range where the magnetic tape is wound on said inner surface and being not less than 30 percent of an area of the range where the magnetic tape is wound, wherein said at least one groove includes upper end edges which are rounded.

2. The tape reel according to claim 1, wherein a width of said at least one groove in a circumferential direction of said tape reel is widened from the inner periphery of said lower flange toward the outer periphery of said lower flange.

3. The tape reel according to claim 2, wherein said at least one groove comprises $4 \leq n \leq 10$ grooves, where n represents the number of grooves, which are provided at equal intervals along a circumferential direction of said lower flange, and further wherein an opening area of all the grooves lying within the range where the magnetic tape is wound on said inner surface is not less than 30 percent of the area of the range where the magnetic tape is wound.

4. The tape reel according to claim 1, wherein said at least one groove comprises $4 \leq n \leq 10$ grooves, where n represents the number of grooves, which are provided at equal intervals along a circumferential direction of said lower flange, and further wherein an opening area of all four grooves lying within the range where the magnetic tape is wound on said inner surface is not less than 30 percent of the area of the range where the magnetic tape is wound.

5. The tape reel according to claim 1, wherein the opening area is 30 to 98% of the area where the magnetic tape is wound.

6. The tape reel according to claim 1, wherein the opening area is 40 to 80% of the area where the magnetic tape is wound.

7. The tape reel according to claim 1, wherein said at least one groove has a depth in a range of from 0.05 mm to 0.25 mm.

8. In a tape cassette containing a pair of tape reels, the improvement characterized in that each of said tape reels having a cylindrical tape winding face on which magnetic tape is to be wound, and upper and lower flanges formed at respective upper and lower axial ends of said tape winding face, each of said upper and lower flanges having an inner periphery proximate to said tape winding face and an outer periphery positioned radially apart from said tape winding face, said tape reel further comprising:

at least one groove disposed in an inner surface of said lower flange, the at least one groove extending radially from said inner periphery to said outer periphery, the at least one groove having a fan-shape with imaginary lines which extend from an innermost portion of sides of the at least one groove so as to intersect at the center of said lower flange, the inner surface being contacted by the magnetic tape so that air interposed in between parts of the magnetic tape wound on said tape winding face is discharged through said at least one groove to the outer periphery of said lower flange; and an opening area of said at least one groove on said inner surface being within a range where the magnetic tape is wound on said inner surface and being not less than 30 percent of an area of the range where the magnetic tape is wound, wherein said at least one groove includes upper end edges which are rounded.

9. The tape cassette according to claim 8, wherein said at least one groove comprises $4 \leq n \leq 10$ grooves, where n represents the number of grooves, which are provided at equal intervals along a circumferential direction of said lower flange, and further wherein an opening area of all the grooves lying within the range where the magnetic tape is wound on said inner surface is not less than 30 percent of the area of the range where the magnetic tape is wound.

10. The tape cassette according to claim 8, wherein said at least one groove has a depth in a range of from 0.05 mm to 0.25 mm.

11. The tape reel cassette according to claim 8, wherein the opening area is 30 to 98% of the area where the magnetic tape is wound.

12. The tape cassette according to claim 8, wherein the opening area is 40 to 80% of the area where the magnetic tape is wound.

13. The tape cassette according to claim 8, wherein a width of said at least one groove in a circumferential direction of said tape reel is widened from the inner periphery of said lower flange toward the outer periphery of said at least one of said upper and lower flanges.

14. The tape cassette according to claim 13, wherein said at least one groove comprises four grooves which are provided at equal intervals along a circumferential direction of said lower flange, and further wherein an opening area of all four grooves lying within the range where the magnetic tape is wound on said inner surface is not less than 30 percent of the area of the range where the magnetic tape is wound.

* * * * *